United States Patent
Xu et al.

(10) Patent No.: US 11,709,570 B2
(45) Date of Patent: Jul. 25, 2023

(54) SENSOR SUBSTRATE AND ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Hao Xu, Beijing (CN); Wenjun Xiao, Beijing (CN); Ji Dong, Beijing (CN); Shijun Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 499 days.

(21) Appl. No.: 16/957,784

(22) PCT Filed: Aug. 8, 2019

(86) PCT No.: PCT/CN2019/099745
§ 371 (c)(1),
(2) Date: Jun. 25, 2020

(87) PCT Pub. No.: WO2021/022539
PCT Pub. Date: Feb. 11, 2021

(65) Prior Publication Data
US 2022/0382395 A1    Dec. 1, 2022

(51) Int. Cl.
G06F 3/044    (2006.01)
G06F 3/041    (2006.01)
G06V 40/13    (2022.01)

(52) U.S. Cl.
CPC .......... *G06F 3/044* (2013.01); *G06F 3/04164* (2019.05); *G06V 40/1306* (2022.01)

(58) Field of Classification Search
CPC .. G06F 3/044; G06F 3/04164; G06V 40/1306
See application file for complete search history.

(56) References Cited

U.S. PATENT DOCUMENTS

| 2013/0321004 A1 | 12/2013 | Chen et al. |
| 2016/0224147 A1* | 8/2016 | Ding ............... G06F 3/0412 |
| 2019/0107911 A1 | 4/2019 | Zhai |

(Continued)

FOREIGN PATENT DOCUMENTS

| CN | 103455223 | 12/2013 |
| CN | 106203026 | 12/2016 |

(Continued)

*Primary Examiner* — Peter D McLoone
(74) *Attorney, Agent, or Firm* — Leason Ellis LLP

(57) ABSTRACT

A sensor substrate and an electronic device are disclosed. The sensor substrate includes a base substrate and a plurality of sensor units spaced apart from each other, each sensor unit includes a hollowed-out electrode and a matching electrode spaced apart from each other, one of the hollowed-out electrode and the matching electrode is a sense electrode and the other is a drive electrode. An orthographic projection of the hollow-out electrode on the base substrate includes an inner edge and an outer edge at an outer side of the inner edge. An orthographic projection of the matching electrode on the base substrate includes a portion at an inner side of the inner edge.

20 Claims, 4 Drawing Sheets

(56) References Cited

U.S. PATENT DOCUMENTS

2019/0204948 A1* 7/2019 Xie .................... G02F 1/13306
2021/0191544 A1* 6/2021 Luo ..................... G06F 3/0412

FOREIGN PATENT DOCUMENTS

| CN | 205827356 | 12/2016 |
| CN | 107329622 | 11/2017 |
| CN | 108196737 | 6/2018 |
| CN | 109189265 | 1/2019 |

* cited by examiner

SENSOR SUBSTRATE AND ELECTRONIC DEVICE

CROSS-REFERENCE TO RELATED PATENT APPLICATIONS

This application is a U.S. National Stage Application under 35 U.S.C. § 371 of International Patent Application No. PCT/CN2019/099745, filed Aug. 8, 2019, which is incorporated by reference in its entirety.

Embodiments of the present disclosure provide a sensor substrate and an electronic device.

BACKGROUND

As a detection device, a sensor (transducer) may sense information to be measured and convert the sensed information into an electrical signal or other information in a required form based on a certain rule for outputting, so as to meet requirements of information transmission, processing, storage, display, recording, control, etc.

As a common sensor, a capacitive sensor is widely applied in electronic devices to implement identification functions, such as touch positioning. The principle of implementing the identification function by using the capacitive sensor is as follows: when a touch object (e.g., a user's finger) touches a touch screen, a coupling capacitance is formed between the user and a surface of the touch screen, which causes a change in capacitance of a touch sensor. An identification circuit identifies such a change to determine the position touched by the user or perform fingerprint identification, or the like.

SUMMARY

Embodiments of the present disclosure provide a sensor substrate and an electronic device, and the sensor substrate has good sensitivity.

At least one embodiment of the present disclosure provides a sensor substrate, which includes: a base substrate; and a plurality of sensor units arranged on the base substrate and spaced apart from each other. Each sensor unit includes a hollowed-out electrode and a matching electrode which are insulated from each other, one of the annular electrode and the matching electrode is a sense electrode, the other one of the annular electrode and the matching electrode is a drive electrode, the hollowed-out electrode has a hollowed-out region, an orthographic projection of the hollowed-out electrode on the base substrate includes an inner edge and an outer edge at an outer side of the inner edge, and at least part of an orthographic projection of the matching electrode on the base substrate is at an inner side of the inner edge.

For example, the plurality of sensor units include a plurality of first sensor units and a plurality of second sensor units, the hollowed-out electrode in each first sensor unit is the sense electrode, the matching electrode in each first sensor unit is the drive electrode, the hollowed-out electrode in each second sensor unit is the drive electrode and the matching electrode in each second sensor unit is the sense electrode.

For example, at least one of the plurality of first sensor units is adjacent to at least one of the plurality of second sensor units.

For example, the plurality of first sensor units and the plurality of second sensor units are arranged alternately in at least one direction.

For example, the sensor substrate further includes: a plurality of sense signal wires arranged in sequence and a plurality of drive signal wires arranged in sequence; each sense signal wire is electrically connected with the sense electrodes of at least two of the plurality of sensor units; each drive signal wire is electrically connected with the drive electrodes of at least two of the plurality of sensor units.

For example, the sensor substrate further includes a plurality of sense leading wires and a plurality of drive leading wires, the plurality of sensor units are arranged into a plurality of sensor groups, each sensor group includes at least two sensor units among the plurality of sensor units, the sense electrodes in the at least two sensor units included by a same sensor group among the plurality of sensor groups are electrically connected with a same sense leading wire among the plurality of sense leading wires, and the drive electrodes in the at least two sensor units included by the same sensor group are electrically connected with a same drive leading wire among the plurality of drive leading wires. For different sensor groups arranged in an extension direction of a same sense signal wire among the plurality of sense signal wires, the sense electrodes in the sensor units included by the different sensor groups are electrically connected with the same sense leading wire, and the drive electrodes in the sensor units included by the different sensor groups are electrically connected with different drive leading wires among the plurality of drive leading wires. An extension direction of the plurality of drive signal wires intersects with an extension direction of the plurality of sense signal wires, and for different sensor groups arranged in the extension direction of a same drive signal wire among the plurality of drive signal wires, the drive electrodes in the sensor units included by the different sensor groups are electrically connected with the same drive leading wire, and the sense electrodes in the sensor units included by the different sensor groups are connected with different sense leading wires among the plurality of sense leading wires.

For example, the sensor substrate further includes an identification circuit, the sense electrodes in the same sensor group are electrically connected with a same signal terminal of the identification circuit through the sense signal wires and the sense leading wire which are electrically connected with the sense electrodes in the same sensor group; the drive electrodes in the same sensor group are electrically connected with another signal terminal of the identification circuit through the drive signal wires and the drive leading wire which are electrically connected with the drive electrodes in the same sensor group.

For example, the plurality of sensor units include a plurality of first sensor units and a plurality of second sensor units; the hollowed-out electrode in each first sensor unit is the sense electrode, the matching electrode in each first sensor unit is the drive electrode, the hollowed-out electrode in each second sensor unit is the drive electrode and the matching electrode in each second sensor unit is the sense electrode; the same sensor group includes at least two first sensor units among the plurality of first sensor units and at least two second sensor units among the plurality of second sensor units.

For example, in the case that the same sensor group includes at least tow first sensor units and at least two second sensor units, in the same sensor group, at least one of the plurality of first sensor units is adjacent to at least one of the plurality of second sensor units.

For example, in the case that the same sensor group includes at least tow first sensor units and at least two second sensor units, in the same sensor group, the plurality of first sensor units and the plurality of second sensor units are arranged alternately in at least one direction.

For example, the plurality of sensor units include a plurality of first sensor units and a plurality of second sensor units; the hollowed-out electrode in each first sensor unit is the sense electrode, the matching electrode in each first sensor unit is the drive electrode, the hollowed-out electrode in each second sensor unit is the drive electrode and the matching electrode in each second sensor unit is the sense electrode; the plurality of sensor groups include a first sensor group only which includes the first sensor units and a second sensor group only which includes the second sensor units.

For example, the hollowed-out electrode and the matching electrode are in a same layer, and the entire matching electrode is within the hollowed-out region of the hollowed-out electrode.

For example, the hollowed-out electrode and the matching electrode are in different layers.

For example, in a direction perpendicular to the base substrate, the matching electrode is between the hollowed-out electrode and the base substrate; and the orthographic projection of the matching electrode includes a portion at the inner side of the inner edge of the orthographic projection of the hollowed-out electrode, and further includes another portion at an outer side of the outer edge of the orthographic projection of the hollowed-out electrode.

For example, the entire orthographic projection of the matching electrode is at the inner side of the inner edge of the orthographic projection of the hollowed-out electrode.

For example, the sensor substrate further includes a plurality of signal wires arranged in sequence, the plurality of signal wires include a first signal wire and a second signal wire, an orthographic projection of the first signal wire on the base substrate is overlapped with the orthographic projection of the hollowed-out electrode and is outside the orthographic projection of the matching electrode, an orthographic projection of the second signal wire on the base substrate is overlapped with each of the orthographic projection of the hollowed-out electrode and the orthographic projection of the matching electrode.

For example, the sensor substrate further includes a pixel electrode, and the pixel electrode is at a side, away from the base substrate, of the plurality of sensor units.

For example, the sensor substrate includes a common electrode layer which includes the plurality of sensor units.

At least one embodiment of the present disclosure further provides an electronic device, which includes the sensor substrate according to any one of the above embodiments.

For example, the electronic device further includes an opposite substrate and a liquid crystal layer, the opposite substrate is opposite to the sensor substrate, and the liquid crystal layer is between the opposite substrate and the sensor substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
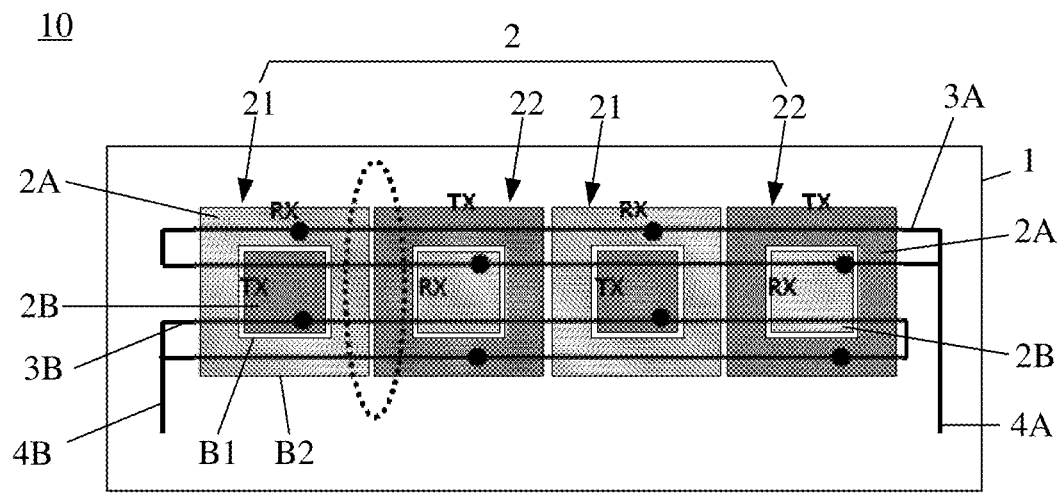
FIG. 1 is a first schematic partial plan view of a sensor substrate according to at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, capacitive sensors include self-capacitive sensors and mutual-capacitive sensors; an excitation signal of the self-capacitive sensor is output and received by a self-capacitive electrode; the mutual-capacitive sensor includes a plurality of strip-shaped drive electrodes and a plurality of strip-shaped sense electrodes, an extension direction of the drive electrodes intersects an extension direction of the sense electrodes, the drive electrode sends out the excitation signal, and the sense electrode receives the signal.

Embodiments of the present disclosure provide a sensor substrate and an electronic device including the sensor substrate. The sensor substrate includes a base substrate and a plurality of sensor units located on the base substrate and spaced apart from each other. Each sensor unit includes a hollowed-out electrode and a matching electrode which are insulated from each other, one of the hollowed-out electrode and the matching electrode is a sense electrode, the other one of the hollowed-out electrode and the matching electrode is a drive electrode, an orthographic projection of the hollowed-out electrode on the base substrate includes an inner edge and an outer edge located at an outer side of the inner edge, and an orthographic projection of the matching electrode on the base substrate includes a portion located at an inner side of the inner edge. Compared with the mutual-capacitive sensor including the drive electrodes and the sense electrodes which have intersected extension directions, in the embodiments of the present disclosure, the mutual capacitance formed between the hollowed-out electrode and the matching electrode is greater, and therefore, the sensor substrate has higher sensitivity.

For example, the sensor substrate is configured as a touch substrate for implementing touch positioning or a fingerprint identification substrate for implementing fingerprint identification. For example, the sensor substrate may be used in a liquid crystal display device. For example, the sensor substrate is an array substrate of the liquid crystal display device, and in this case, the sensor substrate further includes a transistor array, signal wires (e.g., gate lines, data lines, and so on), pixel electrodes, and so on. The functions and applications of the sensor substrate in the embodiments of the present disclosure include, but are not limited to, those listed.

As shown in FIG. 1, at least one embodiment of the present disclosure provides a sensor substrate 10, which includes a base substrate 1 and a plurality of sensor units 2 spaced apart from each other (in FIG. 1, four sensor units 2 are taken as an example). Each sensor unit 2 includes a hollowed-out electrode 2A and a matching electrode 2B which are spaced apart from each other, one of the hollowed-out electrode 2A and the matching electrode 2B is a sense electrode (RX) and the other is a drive electrode (TX). The hollowed-out electrode 2A has a hollowed-out region, so that an orthographic projection of the hollowed-out electrode 2A on the base substrate 1 is, for example, a closed ring and includes an inner edge B1 and an outer edge B2 located at an outer side of the inner edge B1; the matching electrode 2B has, for example, a continuous block-like structure; and an orthographic projection of the matching electrode 2B on the base substrate 1 includes a portion located at an inner side of the inner edge B1; for example, the entire or only a portion of the orthographic projection of the matching electrode 2B is located at the inner side of the inner edge B1.

Figure 2A:
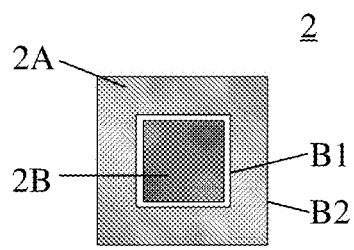
FIG. 2A is a first schematic plan view of a sensor unit included in the sensor substrate according to at least one embodiment of the present disclosure.
Figure 2B:
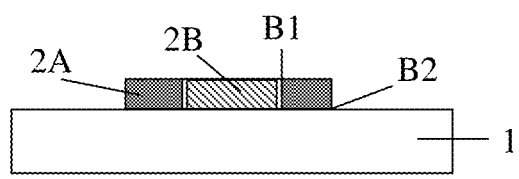
FIG. 2B is a schematic sectional view of the sensor unit shown in FIG. 2A according to at least one embodiment of the present disclosure.

For example, as shown in FIGS. 1 to 2B, the entire orthographic projection of the matching electrode 2B on the base substrate 1 is located at the inner side of the inner edge B1. In this case, for example, the hollowed-out electrode 2A and the matching electrode 2B are located in the same layer (i.e., the hollowed-out electrode 2A and the matching electrode 2B are formed by patterning the same film), so that a greater mutual capacitance is formed between the hollowed-out electrode 2A and the matching electrode 2B; or, the hollowed-out electrode 2A and the matching electrode 2B may be located in different layers, that is, the hollowed-out electrode 2A and the matching electrode 2B are formed by different films respectively. In addition, in some embodiments, in the case where the entire orthographic projection of the matching electrode 2B on the base substrate 1 is located at the inner side of the inner edge B1, because the orthographic projections of the hollowed-out electrode 2A and the matching electrode 2B do not overlap each other, for example, the identification circuit included in the sensor substrate is configured to identify not only a change in the mutual capacitance between the hollowed-out electrode 2A and the matching electrode 2B, but also changes in the self-capacitances of the hollowed-out electrode 2A and the matching electrode 2B themselves, so that the integration of the self-capacitance and the mutual capacitance may be realized to further improve the sensitivity of the sensor substrate.

Figure 3A:
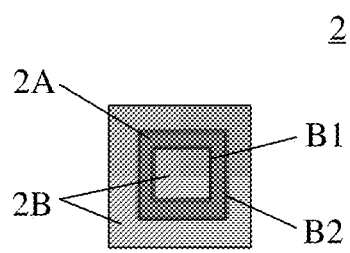
FIG. 3A is a second schematic plan view of the sensor unit included in the sensor substrate according to at least one embodiment of the present disclosure.
Figure 3B:
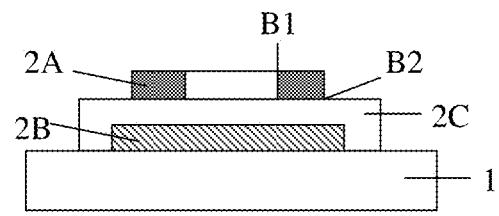
FIG. 3B is a schematic sectional view of the sensor unit shown in FIG. 3A according to at least one embodiment of the present disclosure.

In other embodiments, for example, as shown in FIGS. 3A and 3B, only a partial orthographic projection of the matching electrode 2B is located at the inner side of the inner edge B1, and the orthographic projection of the matching electrode 2B further includes a portion located on an outer side of the outer edge B2 of the orthographic projection of the hollowed-out electrode 2A, so that a greater mutual capacitance is formed between the hollowed-out electrode 2A and the matching electrode 2B. In this case, for example, the hollowed-out electrode 2A and the matching electrode 2B are spaced apart by an insulating layer 2C, thus the hollowed-out electrode 2A and the matching electrode 2B are located in different layers, and the matching electrode 2B is located between the hollowed-out electrode 2A and the base substrate 1 in a direction perpendicular to the base substrate 1.

For example, referring to FIG. 1, the plurality of sensor units 2 in the sensor substrate 10 includes a plurality of first sensor units 21 and a plurality of second sensor units 22. The hollowed-out electrode 2A in each first sensor unit 21 is a sense electrode RX, the matching electrode 2B in each first sensor unit 21 is a drive electrode TX, the hollowed-out electrode 2A in each second sensor unit 22 is a drive electrode TX and the matching electrode 2B in each second sensor unit 22 is a sense electrode RX, which facilitates a reduction in a signal coupling difference between the signal wires and the sensor units 2 included in the sensor substrate. In addition, in the case where coverage areas of the hollowed-out electrode 2A and the matching electrode 2B are not equal, by providing the first sensor unit 21 and the second sensor unit 22 (within an error tolerance range, the coverage areas of the hollowed-out electrodes 2A in different sensor units are equal and the coverage areas of the matching electrodes 2B are also equal), the difference existing between the load between the sense electrodes RX and the signal wire included in the sensor substrate and the load between the drive electrodes TX and the signal wire is relatively small. Thus, in the case that the sensor substrate is used in the liquid crystal display device, the sensor substrate may improve grid and horizontal stripe display defects of the liquid crystal display device.

Figure 4:
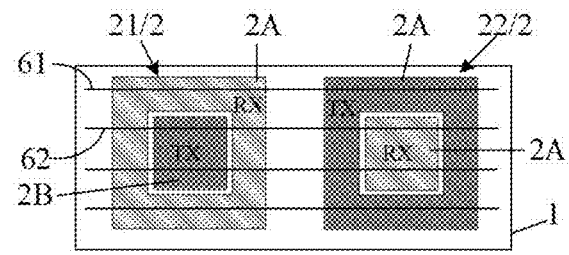
FIG. 4 is a second schematic partial plan view of the sensor substrate according to at least one embodiment of the present disclosure.

Taking FIG. 4 as an example, for example, the sensor substrate 10 further includes a plurality of signal wires (in FIG. 4, four signal wires are taken as an example) arranged in sequence, the plurality of signal wires include a first signal wire 61 and a second signal wire 62, an orthographic projection of the first signal wire 61 on the base substrate 1 overlaps with an orthographic projection of the hollowed-out electrode 2A and is located outside an orthographic projection of the matching electrode 2B, and an orthographic projection of the second signal wire 62 on the base substrate 1 overlaps with each of the orthographic projection of the hollowed-out electrode 2A and the orthographic projection of the matching electrode 2B. Because the sensor substrate 10 includes the first sensor unit 21 and the second sensor unit 22, each of the first signal wire 61 and the second signal wire 62 overlaps with the sense electrodes RX and the drive electrodes TX, so that the difference between the signal coupling existing between the first signal wire 61 and the sensor units 2 and the signal coupling existing between the second signal wire 62 and the sensor units 2 is relatively small. In the case where the sensor substrate is used for the liquid crystal display device, because the relatively small differences in load and signal coupling exist between the signal wires and the sensor units 2, the sensor substrate may improve grid and horizontal stripe display defects of the liquid crystal display device. For example, in the case where the sensor substrate is used for the liquid crystal display device, the first and second signal wires 61 and 62 may both be gate lines or data lines or other types of signal wires which are not electrically connected with the sensor units 2.

Figure 5:
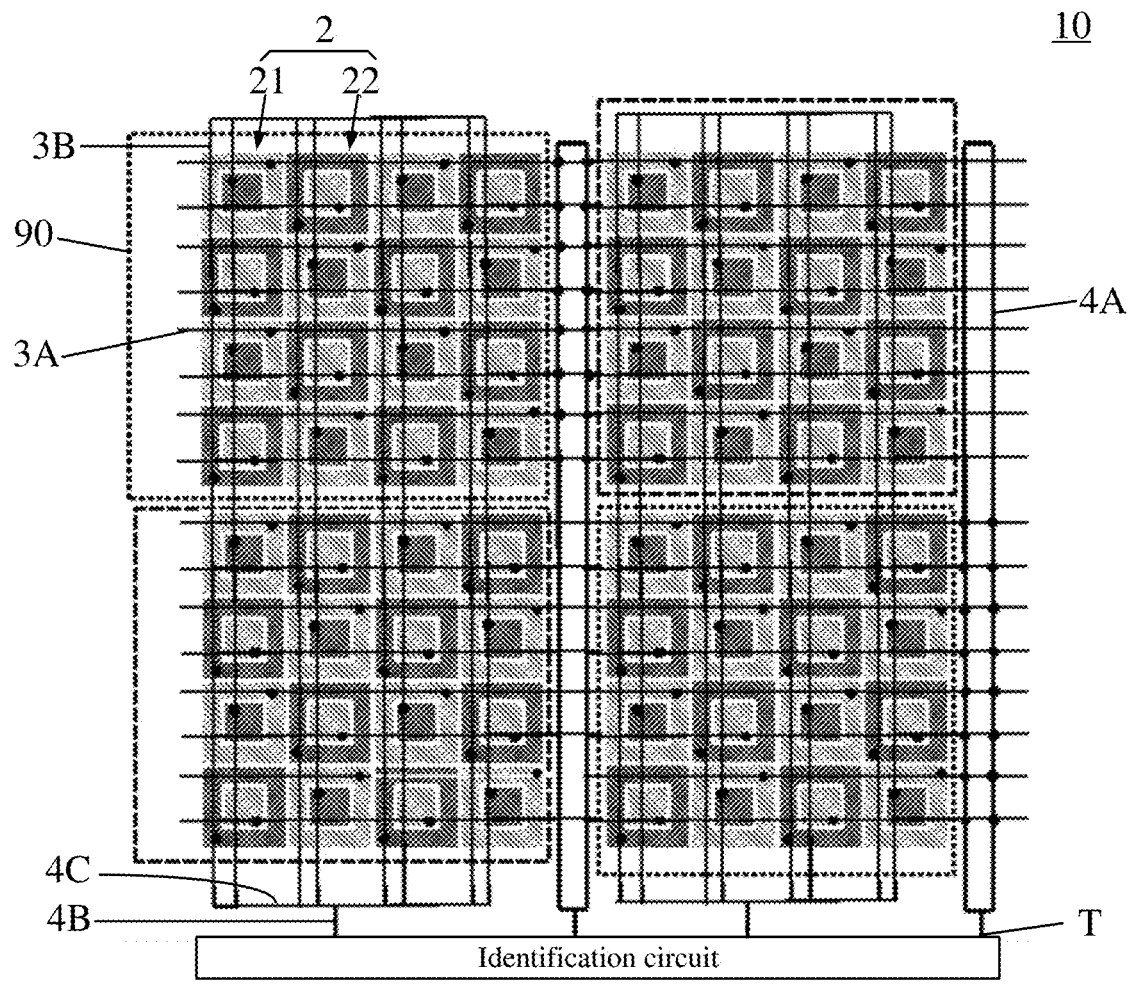
FIG. 5 is a first schematic partial plan view of a plurality of sensor groups included in the sensor substrate according to at least one embodiment of the present disclosure.

For example, as shown in FIGS. 1 and 5, at least one of the above-mentioned plurality of first sensor units 21 is adjacent to at least one of the above-mentioned plurality of second sensor units 22 (no other sensor unit 2 is provided between the adjacent sensor units 2). Because the first sensor unit 21 is adjacent to the second sensor unit 22, a mutual capacitance is generated between the sense electrode of the first sensor unit (RX in FIG. 1, the region where the stripe-filled pattern is located in FIG. 5) and the drive electrode of the second sensor unit 22 (TX in FIG. 1, the region where the dark pattern is located in FIG. 5) (the first sensor unit 21 and the second sensor unit 22 generate the mutual capacitance at a position shown by a dotted line in FIG. 1), which further improves the sensitivity of the sensor substrate 10. For example, as shown in FIGS. 1 and 5, the plurality of first sensor units 21 and the plurality of second sensor units 22 are arranged alternately in at least one direction (for example, a horizontal direction in FIG. 1, a horizontal direction and a vertical direction in FIG. 5), which beneficially makes more first sensor units 21 adjacent to the second sensor units 22 to improve the sensitivity of the sensor substrate.

Figure 6:
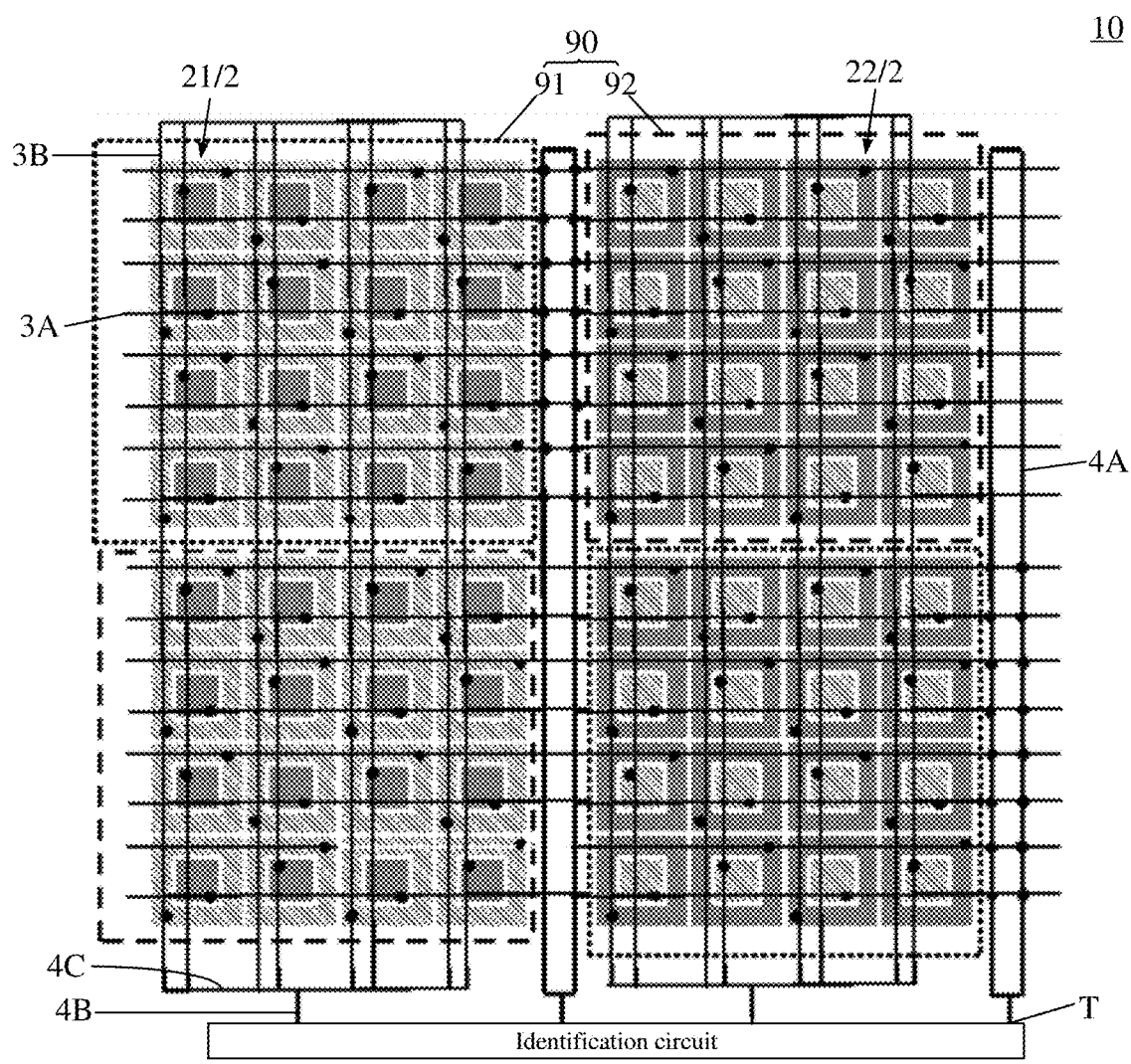
FIG. 6 is a second schematic partial plan view of the plurality of sensor groups included in the sensor substrate according to at least one embodiment of the present disclosure.

For example, as shown in FIGS. 5 and 6, the plurality of sensor units 2 included in the sensor substrate 10 are arranged into in a plurality of sensor groups 90 (the sensor units 2 defined by each dotted line in FIGS. 5 and 6), each sensor group 90 includes at least two sensor units 2 (in FIGS. 5 and 6, each sensor group 90 including 4 rows and 4 columns of sensor units 2 is taken as an example), and the sense electrodes in the same sensor group 90 are electrically connected with each other and the drive electrodes in the same sensor group 90 are electrically connected with each other. In the embodiment shown in FIG. 5, the same sensor group 90 includes a plurality of first sensor units 21 and a plurality of second sensor units 22, which further facilitates the reduction in load difference and signal coupling difference between the signal wires and the sensor units 2, thereby improving the grid and horizontal stripe display defects of the liquid crystal display device. In the embodiment shown in FIG. 6, the plurality of sensor groups 90 includes a plurality of first sensor groups 91 and a plurality of second sensor groups 92, the first sensor group 91 only includes the first sensor units 21 (e.g., the first sensor group 91 includes at least two first sensor units 21 and does not include the second sensor unit 22), and the second sensor group 92 only includes the second sensor unit 22 (e.g., the second sensor group 92 includes at least two second sensor units 22 and does not include the first sensor unit 21); by means of the same sensor group 90 only including the same type of sensor units 2, the signal control of the sensor substrate 10 may be simplified.

For example, as shown in FIGS. 1, 5 and 6, the sensor substrate 10 further includes a plurality of sense signal wires 3A arranged in sequence and a plurality of drive signal wires 3B arranged in sequence, and the extension direction of the sense signal wires 3A is the same as (as shown in FIG. 1) or intersects with (as shown in FIGS. 5 and 6) the extension direction of the drive signal wires 3B. Each sense signal wire 3A is electrically connected with the sense electrodes of at least two sensor units 2 through via holes (see black dots in the drawings) respectively, and the orthographic projection of each sense signal wire 3A on the base substrate overlaps with the orthographic projection of the sensor units 2 electrically connected with the sense signal wire 3A on the base substrate. Each drive signal wire 3B is electrically connected with the drive electrodes of at least two sensor units 2 through via holes respectively, and the orthographic projection of each drive signal wire 3B on the base substrate overlaps with the orthographic projection of the sensor units 2 electrically connected with the drive signal wire 3B on the base substrate.

For example, as shown in FIGS. 5 and 6, the sensor substrate 10 further includes a plurality of sense leading wires 4A and a plurality of drive leading wires 4B, and orthographic projections of the sense leading wires 4A and the drive leading wires 4B on the base substrate are all located outside the orthographic projections of the above-mentioned plurality of sensor units 2. The sense electrodes in each sensor group 90 are electrically connected with the same sense leading wire 4A through the sense signal wires 3A (for example, the sense leading wire 4A has a single leading wire structure or a parallel-connection structure of two or more leading wires), and the drive electrodes in each sensor group 90 are electrically connected with the same drive leading wire 4B through the drive signal wires 3B. That is, the sense electrodes within the same sensor group 90 are electrically connected with each other through the sense signal wires 3A and the sense leading wire 4A, and the drive electrodes within the same sensor group 90 are electrically connected with each other through the drive signal wires 3B and the drive leading wire 4B.

For example, in the embodiments shown in FIGS. 5 and 6, the sensor units 2 in each sensor group 90 are arranged in a matrix of m×n (m and n are both greater than or equal to 2); for example, the matrix has n sensor units 2 in the extension direction of the same sense signal wire 3A, and the matrix has m sensor units 2 in the extension direction of the same drive signal wire 3B. In the same sensor group 90, the n sensor units 2 arranged in the extension direction of the same sense signal wire 3A are all electrically connected with two sense signal wires 3A connected in parallel, so that the sensor units 2 of the matrix are electrically connected with the same sense leading wire 4A through $2m$ sense signal wires 3A (the sense leading wire 4A includes two leading wires connected in parallel, for example), and thus, the sense leading wire 4A connects the $2m$ sense signal wires 3A in parallel; the sense leading wire 4A is, for example, located at the periphery of the sensor group 90 (e.g., the sense leading wire 4A is in a gap between adjacent sensor groups 90) and the extension direction of the sense leading wire 4A is, for example, substantially parallel to the extension direction of the drive signal wire 3B. Similarly, in the same sensor group 90, m sensor units 2 arranged in the extension direction of the same drive signal wire 3B are all electrically connected with two drive signal wires 3B connected in parallel, so that the sensor units 2 of the matrix are electrically connected with the same drive leading wire 4B through $2n$ drive signal wires 3B; for example, end portions which are included by the $2n$ drive signal wires 3B and which are located on the same side of the sensor group 90 are connected in parallel by the same conductive wire 4C (the extension direction of the conductive wire 4C is, for example, substantially parallel to the extension direction of the sense signal wire 3A), and are electrically connected with the same drive leading wire 4B by the same conductive wire 4C.

For example, as shown in FIGS. 5 and 6, for different sensor groups 90 (e.g., at least two sensor groups 90) arranged in the extension direction of the same sense signal wire 3A, the sense electrodes in the sensor units 2 included in the different sensor groups 90 are electrically connected with the same sense leading wire 4A, and the drive electrodes in the different sensor groups 90 are electrically connected with different drive leading wires 4B. For example, in the case where the extension direction of the drive signal wire 3B intersects with the extension direction of the sense signal wire 3A, for different sensor groups 90 (for example, at least two sensor groups 90) arranged in the extension direction of the same drive signal wire 3B, the drive electrodes in the sensor units 2 included in the different sensor groups 90 are electrically connected with the same drive leading wire 4B and the sense electrodes in the different sensor groups 90 are connected with different sense leading wires 4A.

For example, as shown in FIGS. 5 and 6, the sensor substrate 10 further includes an identification circuit 5, and the sense electrodes in the same sensor group 90 are electrically connected with the same signal terminal T of the identification circuit 5 through the sense signal wires 3A and the sense leading wire 4A which are electrically connected with the sense electrodes in the same sensor group 90; the drive electrodes in the same sensor group 90 are electrically connected with another signal terminal T of the identification circuit 5 through the drive signal wires 3B and the drive leading wire 4B which are electrically connected with the drive electrodes in the same sensor group 90. For example, taking the sensor substrate 10 as a touch substrate as an example, when touch occurs, the identification circuit 5 may determine a first coordinate (for example, a coordinate in the vertical direction in FIGS. 5 and 6) by the sense leading wire 4A, and the identification circuit 5 may determine a second coordinate (for example, a coordinate in the horizontal direction in FIGS. 5 and 6) by the drive leading wire 4B, thereby determining a touch position.

As described above, the sensor substrate 10 according to the embodiments of the present disclosure may be an array substrate of the liquid crystal display device. In this case, in order to simplify a manufacturing process and facilitate lightness and thinness of the array substrate, for example, the sense signal wire 3A and one of the gate line and the data line in the array substrate have substantially the same extension direction and are disposed in the same layer (formed by the same film), and the drive signal wire 3B and the other of the gate line and the data line in the array substrate have substantially the same extension direction and are disposed in the same layer; for example, the sense leading wire 4A and one of the gate line and the data line have substantially the same extension direction and are disposed in the same layer; for example, the drive leading wire 4B and one of the gate line and the data line are disposed in the same layer.

Figure 7A:
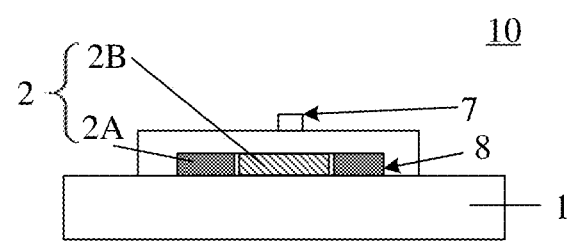
FIG. 7A is a schematic sectional view of one pixel electrode and one sensor unit in the sensor substrate according to at least one embodiment of the present disclosure.
Figure 7B:
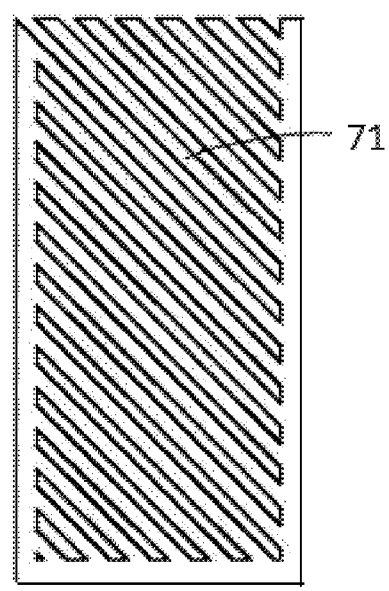
FIG. 7B is a schematic top view of the pixel electrode in the sensor substrate according to at least one embodiment of the present disclosure.

For example, as shown in FIG. 7A, the sensor substrate 10 further includes a pixel electrode 7 located on a side of the plurality of sensor units 2 away from the base substrate 1; for example, as shown in FIG. 7B, the pixel electrode 7 includes, for example, a plurality of strip-shaped electrodes 71 spaced apart from each other due to slits. It should be noted that FIG. 7A only shows one pixel electrode 7 and one sensor unit 2, and the size relationship between the pixel electrode 7 and the sensor unit 2 in FIG. 7A does not reflect an actual proportion. In the embodiments of the present disclosure, by providing the sensor unit 2 between the pixel electrode 7 and the base substrate 1, the sensor unit 2 may be prevented from affecting an electric field for controlling liquid crystal.

For example, as shown in FIG. 7A, in the case where the pixel electrode 7 is located on the side of the plurality of sensor units 2 away from the base substrate 1, the sensor substrate 10 includes a common electrode layer 8, and the common electrode layer 8 includes the plurality of sensor units 2. By applying a common electrode signal to the hollowed-out electrodes 2A and the matching electrodes 2B included in the plurality of sensor units 2 included in the sensor substrate 10, the plurality of sensor units 2 may be used as common electrodes to simplify the structure of the sensor substrate 10 as an array substrate.

For example, in the case that the sensor substrate 10 is an array substrate, the pixel electrodes 7 as well as the hollowed-out electrodes 2A and the matching electrodes 2B included in the sensor units 2 are all transparent electrodes. For example, the transparent electrode is made of a transparent conductive material, such as ITO (indium tin oxide) or IZO (indium zinc oxide), or the like.

At least one embodiment of the present disclosure further provides an electronic device, which includes the sensor substrate 10 according to any one of the above-mentioned embodiments.

For example, the electronic device may be any product or component with a sensing function, such as a liquid crystal panel, electronic paper, an OLED panel, a mobile phone, a tablet computer, a television, a display, a notebook computer, a digital photo frame, a navigator, or the like.

Figure 8:
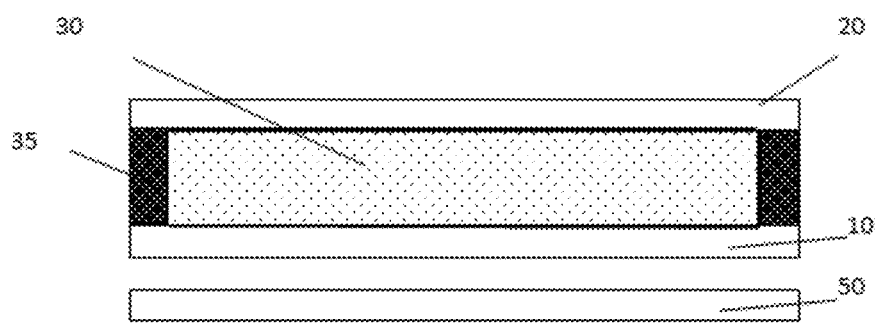
FIG. 8 is a schematic sectional view of an electronic device according to at least one embodiment of the present disclosure.

For example, in the case where the electronic device is a liquid crystal display device, as shown in FIG. 8, the electronic device further includes an opposite substrate 20 and a liquid crystal layer 30, the opposite substrate 20 is opposite to the sensor substrate 10 and is connected with the sensor substrate 10 by a sealant 35, and the liquid crystal layer 30 is located between the opposite substrate 20 and the sensor substrate 10. For example, the opposite substrate 20 is a color filter substrate including a color filter layer. In some embodiments, the electronic device further includes a backlight source 50 for providing backlight. The liquid crystal display device further includes sub-pixels arranged in a matrix. In some embodiments, for example, the hollowed-out electrode and the matching electrode which are included in each sensor unit in the sensor substrate 10 correspond to a plurality of sub-pixels, and both a boundary between the hollowed-out electrode and the matching electrode and a boundary between adjacent sensor units correspond to boundaries between adjacent sub-pixels ("correspond" herein refers to the overlap of the orthographic projections on the base substrate).

In summary, embodiments of the present disclosure provide the sensor substrate and the electronic device including the sensor substrate. Compared with the mutual-capacitive sensor including drive electrodes and sense electrodes which have intersectant extension directions, greater mutual capacitances are formed between the hollowed-out electrodes and the matching electrodes included in the sensor substrate according to the embodiments of the present disclosure, so that the sensor substrate has higher sensitivity.

Embodiments of the sensor substrate and the electronic device substrate according to the embodiments of the present disclosure may be referred to one another. The embodiments of the present disclosure and features of the embodiments may be combined with one another without conflicts.

What are described above is related to the illustrative embodiments of the disclosure only and not limitative to the scope of the disclosure; the scopes of the disclosure are defined by the accompanying claims.

What is claimed is:

1. A sensor substrate, comprising:
 a base substrate; and
 a plurality of sensor units arranged on the base substrate and spaced apart from each other, wherein each sensor unit comprises a hollowed-out electrode and a matching electrode which are insulated from each other, one of the hollowed-out electrode and the matching electrode is a sense electrode, the other one of the hollowed-out electrode and the matching electrode is a drive electrode, the hollowed-out electrode has a hollowed-out region, an orthographic projection of the hollowed-out electrode on the base substrate comprises an inner edge and an outer edge at an outer side of the inner edge, and at least part of an orthographic projection of the matching electrode on the base substrate is at an inner side of the inner edge, wherein
 the plurality of sensor units comprise a plurality of first sensor units and a plurality of second sensor units,
 the hollowed-out electrode in each first sensor unit is the sense electrode, the matching electrode in each first sensor unit is the drive electrode, the hollowed-out electrode in each second sensor unit is the drive electrode and the matching electrode in each second sensor unit is the sense electrode.

2. The sensor substrate according to claim 1, wherein at least one of the plurality of first sensor units is adjacent to at least one of the plurality of second sensor units.

3. The sensor substrate according to claim 1, wherein the plurality of first sensor units and the plurality of second sensor units are arranged alternately in at least one direction.

4. The sensor substrate according to claim 1, further comprising:
 a plurality of sense signal wires arranged in sequence, wherein each sense signal wire is electrically connected with the sense electrodes of at least two of the plurality of sensor units; and
 a plurality of drive signal wires arranged in sequence, wherein each drive signal wire is electrically connected with the drive electrodes of at least two of the plurality of sensor units.

5. The sensor substrate according to claim 4, further comprising a plurality of sense leading wires and a plurality of drive leading wires, wherein
 the plurality of sensor units are arranged into a plurality of sensor groups, each sensor group comprises at least two sensor units among the plurality of sensor units, the sense electrodes in the at least two sensor units comprised by a same sensor group among the plurality of sensor groups are electrically connected with a same sense leading wire among the plurality of sense leading wires, and the drive electrodes in the at least two sensor units comprised by the same sensor group are electrically connected with a same drive leading wire among the plurality of drive leading wires;
 for different sensor groups arranged in an extension direction of a same sense signal wire among the plurality of sense signal wires, the sense electrodes in the sensor units comprised by the different sensor groups are electrically connected with the same sense leading wire, and the drive electrodes in the sensor units comprised by the different sensor groups are electrically connected with different drive leading wires among the plurality of drive leading wires;
 an extension direction of the plurality of drive signal wires intersects with an extension direction of the plurality of sense signal wires, and for different sensor groups arranged in the extension direction of a same drive signal wire among the plurality of drive signal wires, the drive electrodes in the sensor units comprised by the different sensor groups are electrically connected with the same drive leading wire, and the sense electrodes in the sensor units comprised by the different sensor groups are connected with different sense leading wires among the plurality of sense leading wires.

6. The sensor substrate according to claim 5, further comprising an identification circuit, wherein
 the sense electrodes in the same sensor group are electrically connected with a same signal terminal of the identification circuit through the sense signal wires and the sense leading wire which are electrically connected with the sense electrodes in the same sensor group;
 the drive electrodes in the same sensor group are electrically connected with another signal terminal of the identification circuit through the drive signal wires and the drive leading wire which are electrically connected with the drive electrodes in the same sensor group.

7. The sensor substrate according to claim 5, wherein the same sensor group comprises at least two first sensor units among the plurality of first sensor units and at least two second sensor units among the plurality of second sensor units.

8. The sensor substrate according to claim 7, wherein in the same sensor group, at least one of the plurality of first sensor units is adjacent to at least one of the plurality of second sensor units.

9. The sensor substrate according to claim 7, wherein the plurality of first sensor units and the plurality of second sensor units are arranged alternately in at least one direction.

10. The sensor substrate according to claim 5, wherein the plurality of sensor groups comprise a first sensor group only comprising the first sensor units and a second sensor group only comprising the second sensor units.

11. The sensor substrate according to claim 1, wherein the hollowed-out electrode and the matching electrode are in a same layer, and the entire matching electrode is within the hollowed-out region of the hollowed-out electrode.

12. The sensor substrate according to claim 1, wherein the hollowed-out electrode and the matching electrode are in different layers.

13. The sensor substrate according to claim 12, wherein in a direction perpendicular to the base substrate, the matching electrode is between the hollowed-out electrode and the base substrate; and
 the orthographic projection of the matching electrode comprises a portion at the inner side of the inner edge of the orthographic projection of the hollowed-out electrode, and further comprises another portion at an outer side of the outer edge of the orthographic projection of the hollowed-out electrode.

14. The sensor substrate according to claim 1, wherein the entire orthographic projection of the matching electrode is at the inner side of the inner edge of the orthographic projection of the hollowed-out electrode.

15. The sensor substrate according to claim 1, further comprising a plurality of signal wires arranged in sequence, wherein
the plurality of signal wires comprise a first signal wire and a second signal wire,
an orthographic projection of the first signal wire on the base substrate is overlapped with the orthographic projection of the hollowed-out electrode and is outside the orthographic projection of the matching electrode,
an orthographic projection of the second signal wire on the base substrate is overlapped with each of the orthographic projection of the hollowed-out electrode and the orthographic projection of the matching electrode.

16. The sensor substrate according to claim 1, further comprising a pixel electrode, wherein
the pixel electrode is at a side, away from the base substrate, of the plurality of sensor units.

17. The sensor substrate according to claim 16, wherein the sensor substrate comprises a common electrode layer comprising the plurality of sensor units.

18. An electronic device, comprising the sensor substrate according to claim 1.

19. The electronic device according to claim 18, further comprising:
an opposite substrate which is opposite to the sensor substrate; and
a liquid crystal layer which is between the opposite substrate and the sensor substrate.

20. A sensor substrate, comprising:
a base substrate; and
a plurality of sensor units arranged on the base substrate and spaced apart from each other, wherein each sensor unit comprises a hollowed-out electrode and a matching electrode which are insulated from each other, one of the hollowed-out electrode and the matching electrode is a sense electrode, the other one of the hollowed-out electrode and the matching electrode is a drive electrode, the hollowed-out electrode has a hollowed-out region, an orthographic projection of the hollowed-out electrode on the base substrate comprises an inner edge and an outer edge at an outer side of the inner edge, and at least part of an orthographic projection of the matching electrode on the base substrate is at an inner side of the inner edge, wherein
the sensor substrate further comprises:
a plurality of sense signal wires arranged in sequence, wherein each sense signal wire is electrically connected with the sense electrodes of at least two of the plurality of sensor units; and
a plurality of drive signal wires arranged in sequence, wherein each drive signal wire is electrically connected with the drive electrodes of at least two of the plurality of sensor units;
the sensor substrate further comprises a plurality of sense leading wires and a plurality of drive leading wires;
the plurality of sensor units are arranged into a plurality of sensor groups, each sensor group comprises at least two sensor units among the plurality of sensor units, the sense electrodes in the at least two sensor units comprised by a same sensor group among the plurality of sensor groups are electrically connected with a same sense leading wire among the plurality of sense leading wires, and the drive electrodes in the at least two sensor units comprised by the same sensor group are electrically connected with a same drive leading wire among the plurality of drive leading wires;
for different sensor groups arranged in an extension direction of a same sense signal wire among the plurality of sense signal wires, the sense electrodes in the sensor units comprised by the different sensor groups are electrically connected with the same sense leading wire, and the drive electrodes in the sensor units comprised by the different sensor groups are electrically connected with different drive leading wires among the plurality of drive leading wires;
an extension direction of the plurality of drive signal wires intersects with an extension direction of the plurality of sense signal wires, and for different sensor groups arranged in the extension direction of a same drive signal wire among the plurality of drive signal wires, the drive electrodes in the sensor units comprised by the different sensor groups are electrically connected with the same drive leading wire, and the sense electrodes in the sensor units comprised by the different sensor groups are connected with different sense leading wires among the plurality of sense leading wires.

\* \* \* \* \*